United States Patent [19]

Gilbert

[11] Patent Number: 5,713,344
[45] Date of Patent: Feb. 3, 1998

[54] PORTABLE COOKING GRILL

[75] Inventor: Bruno C. Gilbert, New Hudson, Mich.

[73] Assignee: The Bruno C. Gilbert Trust, New Hudson, Mich.

[21] Appl. No.: 761,396

[22] Filed: Dec. 6, 1996

[51] Int. Cl.[6] ............................................. F24B 3/00
[52] U.S. Cl. ............................ 126/29; 126/25 R; 126/30; 126/9 R
[58] Field of Search ........................... 126/25 R, 29, 126/30, 9 R, 506

[56] References Cited

U.S. PATENT DOCUMENTS

| | | | |
|---|---|---|---|
| 1,250,861 | 12/1917 | Hackney | 126/9 R |
| 1,442,763 | 1/1923 | Dyer. | |
| 1,448,148 | 3/1923 | O'Kane. | |
| 1,491,080 | 4/1924 | Clark. | |
| 2,148,439 | 2/1939 | Crawford. | |
| 2,408,859 | 10/1946 | Leake, Jr. | |
| 2,573,772 | 11/1951 | Nysten. | |
| 2,631,579 | 3/1953 | Metzger | 126/29 |
| 2,839,043 | 6/1958 | La Bom. | |
| 3,191,592 | 6/1965 | Lorbacher | 126/9 R X |
| 3,641,922 | 2/1972 | Nachazel et al. | 126/506 X |
| 3,667,446 | 6/1972 | Morton. | |
| 3,785,360 | 1/1974 | Martin. | |
| 4,363,313 | 12/1982 | Smith. | |
| 4,393,857 | 7/1983 | Sanford. | |
| 4,488,535 | 12/1984 | Johnson. | |
| 4,598,690 | 7/1986 | Hsu. | |
| 4,688,542 | 8/1987 | Isbell. | |
| 4,688,543 | 8/1987 | Kopke. | |
| 4,721,037 | 1/1988 | Blosnich. | |
| 4,726,349 | 2/1988 | Gehrke. | |
| 4,782,813 | 11/1988 | Kopke. | |
| 4,829,977 | 5/1989 | Valentine. | |
| 4,971,045 | 11/1990 | Probst. | |
| 5,243,961 | 9/1993 | Harris. | |

*Primary Examiner*—Larry Jones
*Attorney, Agent, or Firm*—John R. Benefiel

[57] ABSTRACT

A portable cooking grill supported on support elements slidable on a series of rods driven into the ground and clamped thereto with eyebolts. In one embodiment, a rectangular enclosure open at the top and bottom surrounds a grill supported at an intermediate height to create a chimney effect aiding in cooking. The enclosure is assembled from separate panels without separate fasteners, and a top may be added to create an oven. In a second embodiment, two rods have forked clamping bars slidable thereon and clamped at a selected height with the eyebolts.

22 Claims, 3 Drawing Sheets

PORTABLE COOKING GRILL

BACKGROUND OF THE INVENTION

This invention concerns portable grills (or ovens) adapted for cooking over an open fire when camping or picnicking. Numerous designs for grills convenient for use as a camp stove have heretofore been developed.

It is difficult to achieve consistently proper cooking conditions over an open fire with conventional camp stoves which do not typically provide a completely surrounding shield and which do not allow convenient and effective cooking adjustment over the fire (or charcoal bed).

Such portable cooking appliances should be easy to set up with minimal effort and yet able to be collapsed into a compact space for storage when traveling.

It is the object of the present invention to provide a portable collapsible cooking grill or oven which is particularly effective when cooking over an open fire, and which can be conveniently and quickly set up to create a stable support for food items.

SUMMARY OF THE INVENTION

The above object is achieved by a portable cooking grill including a series of metal rods adapted to be driven into the ground. A grill support element slidable on each rod may be clamped to each rod at any point by an eyebolt threaded into a bore in the support element which is engageable with a rod slidable in a hole in the support element at a selected height, with a cooking grill then supported at the selected height above the ground.

In a first embodiment, a rectangular array of four rods are employed, pairs of the rods each supporting an elongated bar by means of an eyebolt clamp at either end. A pair of crossbars stabilize corresponding adjacent rods of each pair. A grill rests on the elongated bars supported on the pair of rods.

An open-topped enclosure surrounds the grill, the enclosure comprised of a pair of sheet metal side panel plates each resting on an end of each of the support bars, held upright by upwardly extending sections of the rods.

Front and rear panels each have a downwardly turned top edge flange which is hooked over inwardly turned edges of the side panels, the front and rear panels lying within the side edges.

Each of the front, rear, and side panels have skirt portions extending below the support bars and the grill to channel heated air from the fire to the grill by a chimney effect, the upper sections also serving to confine the heat for improved cooking in open locations.

A lid can be fitted to the top edges of the side, front, and rear panels disposed over the grill to create an oven.

A second embodiment relies on a single pair of rods to support a grill. A support element is clamped to each rod at an adjustable height by eyebolts received in threaded bores in the support element and engaging the rod section passed into another hole in the support element. Each support element includes a forked clamping bar which nonrotatably grips one edge of the grill to securely support the grill on the two rods.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
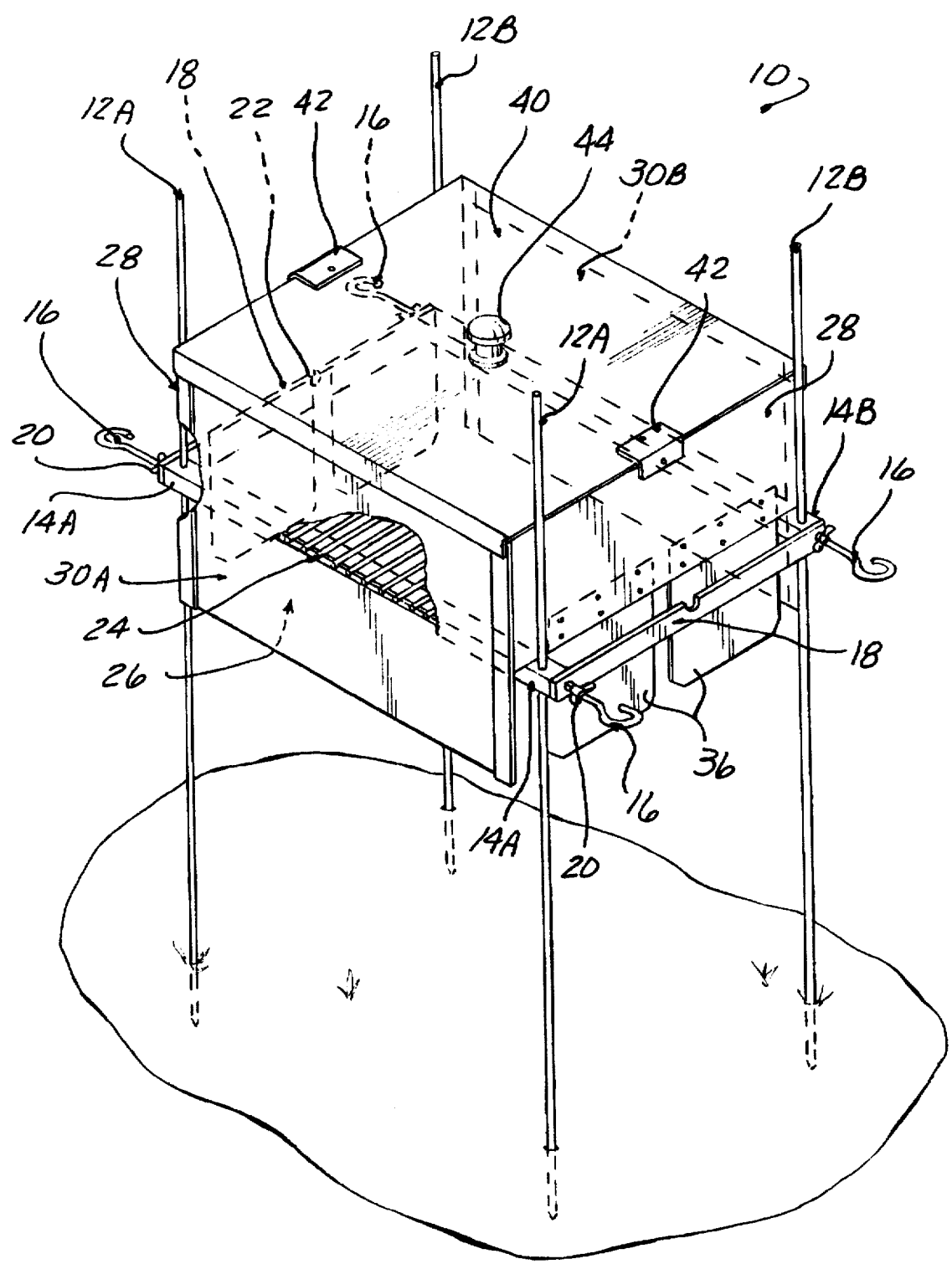
FIG. 1 is a perspective view of a portable cooking grill according to a first embodiment of the invention.
Figure 4:
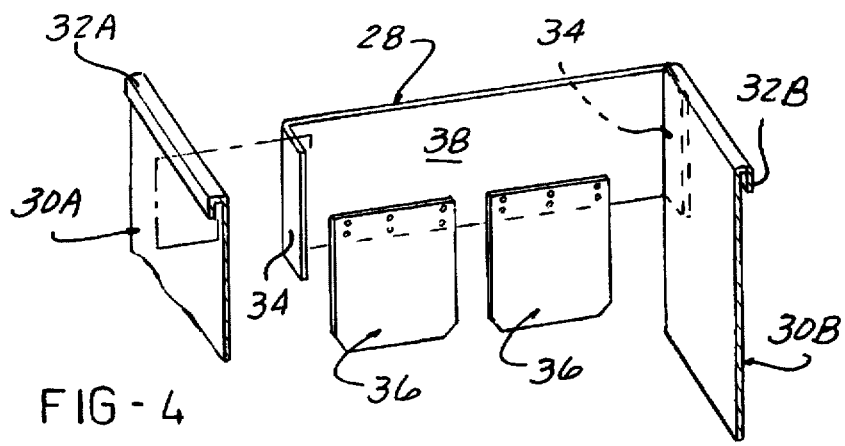
FIG. 4 is an exploded perspective view of a fragmentary portion of panels forming a grill enclosure in the embodiment shown in FIG. 1.
Figure 3:
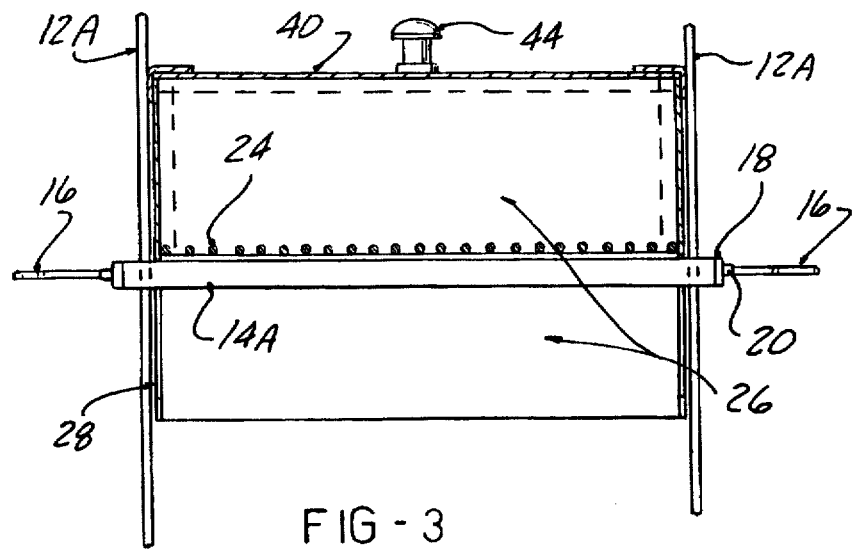
FIG. 3 is a sectional view taken through the portable cooking grill shown in FIGS. 1 and 2.
Figure 2:
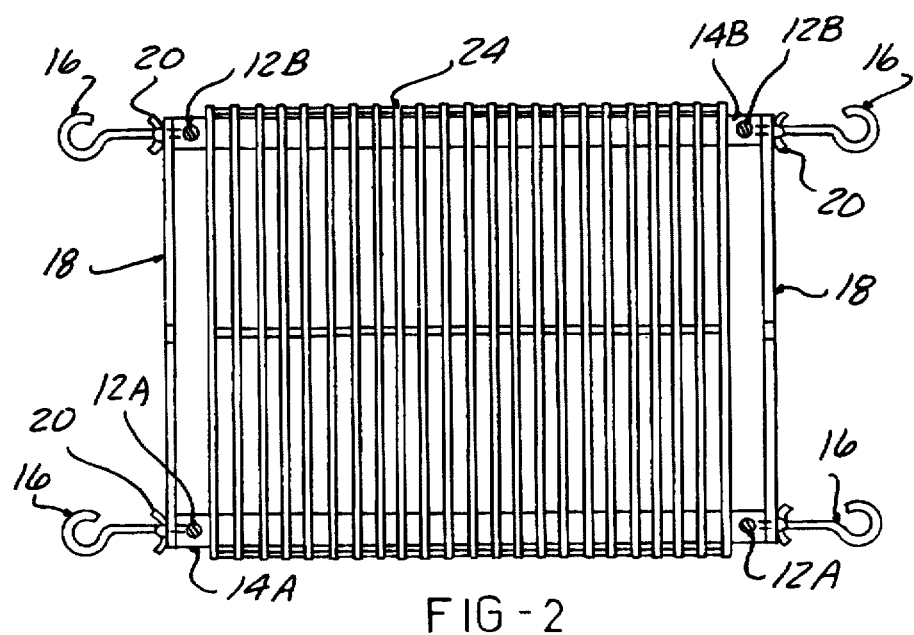
FIG. 2 is a plan view of the portable grill shown in FIG. 1.

Referring to FIG. 1, a portable cooking grill 10 according to a first embodiment of the invention is shown. Four steel rods 12 are driven vertically into the ground in a rectangular array. Aligned pairs of the rods 12A and 12B are connected together by elongated aluminum support bars 14A, 14B, which have holes slidably receiving a respective rod 12.

An eyebolt 16 is threaded into a horizontal threaded bore extending endwise into each end of the support bars 14 such as to enable clamping of each end of each support bar 14 to a respective rod at any selected height above the ground.

A pair of aluminum cross bars 18 maintain the distance between the aligned rod pairs 12A, 12B, the cross bars 18 having upwardly extending slots at either end to be received into eyebolts 16. A wingnut 20 threaded on the shank of each eyebolt 16 tightens against the crossbars 18 to hold them in position.

Each crossbar 18 may also have central notches 22 to support a spit or rotisserie (not shown).

A grill 24 rests on the support bars 14A, 14B, which grill may be removed when a spit is used.

The grill 24 is constructed of a material suitable for direct contact with food items being cooked, such as ceramic or Teflon coated steel or of stainless steel.

The steel rods 12 may be of stainless steel, or steel with an antirust surface treatment such as black oxide. The aluminum support bars 14A, 14B and cross bars 18 may be anodized to resist corrosion and for an improved appearance.

A surrounding enclosure 26 open at the top and bottom extends above and below the level of the grill 24. Enclosure 26 is formed by the assembly of a pair of rectangular side panels 28, a rectangular front panel 30A, and rear panel 30B, each constructed of separate sheet metal pieces preferably of stainless steel.

In one version, the enclosure extends a distance on the order of six inches above the grill and five inches below.

The side panels 28 have their bottom edges resting on support bars 14A, 14B and prevented from leaning out by upper sections of the rods 12A, 12B extending above the level of the grill 24.

The front and rear panels 30A, 30B each have a downwardly rolled top edge 32A, 32B which extends outwardly to hook over a side flange 34 extending vertically on an upper section of each side panel 28 when the front and rear panels 30A, 30B are positioned inside the respective side flanges 34 of the respective front and rear ends of the side panels 28.

Once assembled, the side panels 28 are held between the rods 12A, 12B and the ends of the front and rear panels 30A, 30B, while the front and rear panels 30A, 30B are suspended on the side panels 28 by rolled top edges 32A, 32B and confined behind side flanges 34. Assembly or disassembly can be carried out very quickly without tools or the need for separate small parts.

The side panels 28 each include skirt panels 36 welded to a main panel 38, the skirt panels extending down between the support bars 14A, 14B and slightly spaced to accommodate a spit or rotisserie while substantially completing the enclosure of the space below the grill 24.

In order to provide an oven, a rectangular top 40 is configured to be fit over the top edges of the side panels 28 and front and rear panels 30A, 30B. Angled tabs 42 received over end panels 28 may be included to aid in locating the top. Grasping of a non heat conducting knob 44 allows convenient handling of the top 40.

When cooking over an open fire, as a campfire or charcoal bed, the enclosure 26 open at the top and bottom creates a "chimney" effect, drawing hot air up through the enclosure 26 uniformly heating food items on the grill 24 to create a consistent cooking environment in the enclosure 26, even in windy conditions.

Assembly and disassembly is quickly and conveniently accomplished without tools, and the disassembled components stack together into a compact space for storage or transport.

Figure 5:
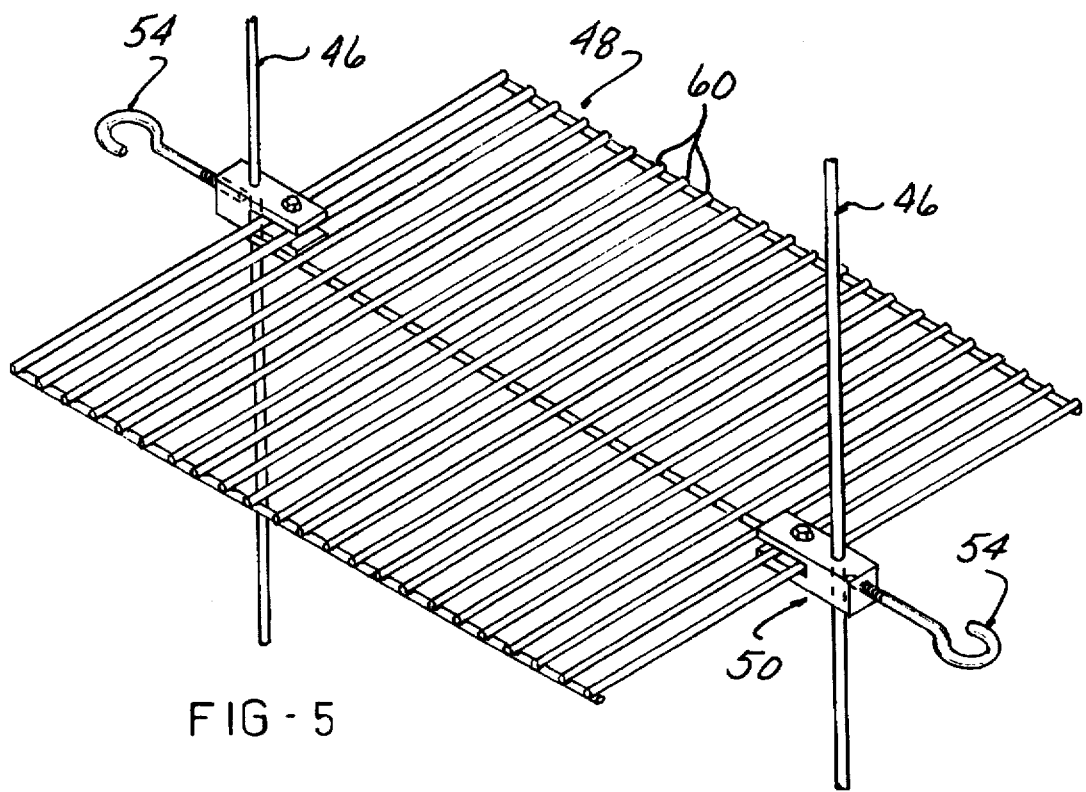
FIG. 5 is a perspective view of a second embodiment of a cooking grill according to the invention.
Figure 6:
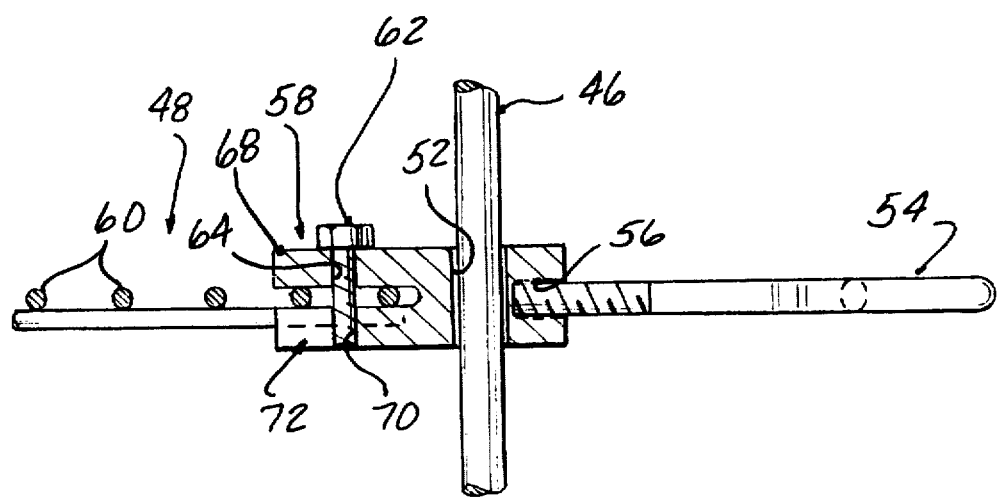
FIG. 6 is an enlarged sectional view of a portion of the grill shown in FIG. 5.

FIGS. 5 and 6 show a second, simpler embodiment, in which only a pair of steel rods 46 are driven into the ground spaced apart so as to be able to receive a cooking grill 48 between them.

A pair of support elements 50 each have a vertical hole 52 to slidably receive a respective rod 46. An eyebolt 54 is threaded into a threaded horizontal bore 56 of each support element 50.

Each support element 50 includes a forked clamping bar 58 which receives rods 60 of the grill 48 adjacent each edge.

A bolt 62 passes through a hole 64 in the upper tine 68 and is threaded into a bore 70 in the lower tine 72 so that when tightened, the rods 60 are securely gripped. The forked clamping bar is of a substantial width, as is the depth of the hole 52 so that turning of the grill 48 is securely resisted to create a stable support on two rods 46.

The support elements 50 remain installed on the grill 48 so that tools are not required to collapse the unit for transport or storage.

Accordingly, a convenient and effective portable cooking grill has been provided.

While eyebolts have been shown as clamping elements, tee bolts, or bolts with other radially projecting finger graspable features such as wings, etc. may be used. The eyebolts are preferred since the projecting open "eyes" provide convenient hooks for hanging cooking tools and other implements at points around the perimeter of the stove.

I claim:

1. A portable cooking grill comprising:

a plurality of rods adapted to be driven into the ground at spaced apart locations defining a rectangular pattern;

a plurality of support elements comprising a pair of elongated support bars each extending between respective aligned pairs of rods, each of said pair of elongated bars having a vertical hole at each end slidably receiving a rod, a horizontal threaded bore at each end of each support bar, extending into an adjacent vertical hole, and a plurality of bolts, each bolt received in a respective threaded hole to enable clamping of each end of each support bar to a respective rod;

each of said bolts having a finger grippable radially projecting feature thereon so that said support element may be clamped to said rod by advance of each of said bolts in said threaded bore to engage a respective rod; and, a cooking grill resting on said support elements at an adjusted height set by the height at which said support bars are clamped to said rods by said bolts.

2. The portable cooking grill according to claim 1 wherein said bolts comprise eyebolts.

3. The portable cooking grill according to claim 1 further including a pair of cross bars each extending between adjacent ends of said support bars, said cross bars received over said bolts which extend endwise in each end of said support bars.

4. The portable cooking grill according to claim 3 further including a wing nut threaded onto each bolt and able to be tightened onto said cross bars.

5. The portable cooking grill according to claim 1 further including an enclosure open at the top and bottom also supported on said support bars surrounding said grill.

6. The portable cooking grill according to claim 5 wherein said enclosure includes portions extending substantially above and below said grill.

7. The portable cooking grill according to claim 6 further including a separate top positioned on said top of said enclosure to create an oven.

8. The portable cooking grill according to claim 6 wherein said enclosure comprises separate side panels each extending across respective ends of said support bars, and separate front and rear panels supported on front and rear edges of said side panels.

9. The portable cooking grill according to claim 6 wherein said enclosure extends several inches above and below said grill.

10. The portable cooking grill according to claim 8 wherein said front and rear panels each have a rolled top edge and said side panels each have inwardly turned corner flanges, said top edges hooked over said corner flanges to support said front and rear panels on said side panels.

11. The portable cooking grill according to claim 10 wherein said rods extend upwardly outside said side panels to confine said side panels therebetween.

12. The portable cooking grill according to claim 10 wherein said front and rear panels are assembled within said corner flanges to be confined therein.

13. The portable cooking grill according to claim 12 wherein said front and rear panels are assembled within said corner flanges to be confined therein.

14. The portable cooking grill according to claim 8 wherein each said side panels include a top portion formed with said cover flanges and also include skirt portions extending below said support bars and grill disposed thereon.

15. The portable cooking grill according to claim 14 wherein said cross bars have central notches, and said skirt portions of said side panels comprise a pair of spaced apart panels having a gap aligned with said notches, whereby a spit can be supported and extend within said enclosure.

16. The portable cooking grill according to claim 14 wherein each said side panels include a top portion formed with said cover flanges and also include skirt portions extending below said support bars and grill disposed thereon.

17. The portable cooking grill according to claim 1 wherein two rods are included, and each support element comprises a forked clamping bar portion of substantial width gripping said grill so as to prevent rotation thereon.

18. A portable cooking grill assembly comprised of a rectangular boxlike enclosure formed by four connected side panels and open at a top and bottom of said four side panels to form a chimney-like structure;

a rod at each corner of said enclosure supporting said enclosure spaced above the ground so as to enable an open fire to be built and maintained beneath said enclosure; and, a grill comprised of an array of spaced apart bars, said grill defining a support for food cooking, said grill mounted within said enclosure at an intermediate level, located several inches from each of said top and bottom of said four side panels forming said enclosure, whereby a draft effect induces a vertical flow of gases heated by said fire to flow up and through said enclosure and past said grill mounted at an intermediate level therein to establish consistent cooking conditions for food supported on said grill.

19. The portable cooking grill according to claim 18 wherein said enclosure comprises separate side panels each extending across respective ends of said support bars, and separate front and rear panels supported on front and rear edges of said side panels.

20. The portable cooking grill according to claim 19 wherein said front and rear panels each have a rolled top edge and said side panels each have inwardly turned corner flanges, said top edges hooked over said corner flanges to support said front and rear panels on said side panels.

21. The portable cooking grill according to claim 20 wherein said rods extend upwardly outside said side panels to confine said side panels therebetween.

22. A portable cooking grill comprised of a rectangular boxlike enclosure open at the top and bottom;

a rod at each corner of said enclosure supporting said enclosure spaced above the ground so as to enable an open fire to be built and maintained beneath said enclosure;

elongate support bars extending between aligned pairs of rods and secured at each end thereof to a respective rod, said enclosure resting on said support bars; and, a cooking grill supported within said enclosure at an intermediate level, several inches from both a top and bottom of said enclosure, whereby a chimney effect induces a vertical flow of gases heated by said fire to flow through said grill to establish consistent cooking conditions on said grill.

\* \* \* \* \*